(12) United States Patent
Nakamura et al.

(10) Patent No.: US 11,303,046 B2
(45) Date of Patent: Apr. 12, 2022

(54) CABLE CONNECTION STRUCTURE

(71) Applicant: OLYMPUS CORPORATION, Tokyo (JP)

(72) Inventors: Mikio Nakamura, Tokyo (JP); Hiroaki Shibuya, Sakado (JP); Takanori Sekido, Sagamihara (JP)

(73) Assignee: OLYMPUS CORPORATION, Tokyo (JP)

(*) Notice: Subject to any disclaimer, the term of this patent is extended or adjusted under 35 U.S.C. 154(b) by 0 days.

(21) Appl. No.: 17/308,265

(22) Filed: May 5, 2021

(65) Prior Publication Data
US 2021/0273348 A1 Sep. 2, 2021

Related U.S. Application Data

(63) Continuation of application No. PCT/JP2018/043577, filed on Nov. 27, 2018.

(51) Int. Cl.
  *H01R 4/02* (2006.01)
  *H01R 12/53* (2011.01)
  *H01R 43/02* (2006.01)
  *H01R 12/57* (2011.01)

(52) U.S. Cl.
  CPC ............ *H01R 4/021* (2013.01); *H01R 12/53* (2013.01); *H01R 12/57* (2013.01); *H01R 43/0207* (2013.01); *H01R 43/0256* (2013.01)

(58) Field of Classification Search
  CPC ............. H01R 4/023; H01R 9/03; H01R 9/05
  See application file for complete search history.

(56) References Cited

U.S. PATENT DOCUMENTS

| 2,603,735 | A | 7/1952 | Butler | |
|---|---|---|---|---|
| 5,192,015 | A | 3/1993 | Ingle et al. | |
| 6,344,616 | B1* | 2/2002 | Yokokawa | H01B 7/00 174/117 F |
| 7,484,998 | B2* | 2/2009 | Benham | H01R 9/0515 439/289 |
| 8,298,008 | B2* | 10/2012 | Negishi | A61B 1/00124 439/579 |

(Continued)

FOREIGN PATENT DOCUMENTS

| JP | H07-169797 A | 7/1995 |
|---|---|---|
| JP | 2003-258030 A | 9/2003 |

(Continued)

OTHER PUBLICATIONS

International Search Report dated Feb. 26, 2019 issued in PCT/JP2018/043577.

(Continued)

*Primary Examiner* — Chau N Nguyen
(74) *Attorney, Agent, or Firm* — Scully, Scott, Murphy & Presser, P.C.

(57) ABSTRACT

A cable connection structure includes an electric cable, an end face of a core wire of which is exposed, a first electrode that covers the end face, a substrate, a terminal of which is exposed on a principal surface, and a second electrode bonded to the first electrode without another member interposed between the first electrode and the second electrode, the second electrode covering the terminal and having substantially same Vickers hardness as Vickers hardness of the first electrode.

16 Claims, 6 Drawing Sheets

(56) References Cited

U.S. PATENT DOCUMENTS

| | | | |
|---|---|---|---|
| 9,947,440 B2 | 4/2018 | Sekido | |
| 2012/0097420 A1* | 4/2012 | Aoyama | H01B 1/026 174/113 R |
| 2014/0042865 A1* | 2/2014 | Mourou | B23K 26/20 310/208 |
| 2017/0000321 A1* | 1/2017 | Nakamura | A61B 1/0011 |

FOREIGN PATENT DOCUMENTS

| | | |
|---|---|---|
| JP | 2011-023134 A | 2/2011 |
| JP | 2011-134613 A | 7/2011 |
| JP | 2012-089288 A | 5/2012 |
| JP | 2012-151183 A | 8/2012 |
| JP | 2013-018003 A | 1/2013 |
| JP | 2013-143464 A | 7/2013 |
| JP | 2014-022692 A | 2/2014 |
| JP | 2014-056917 A | 3/2014 |
| JP | 2014-107064 A | 6/2014 |
| JP | 2015-144168 A | 8/2015 |
| JP | 2015-144169 A | 8/2015 |
| JP | 2016-068148 A | 5/2016 |
| JP | 2016-149448 A | 8/2016 |
| JP | 6371414 B2 | 8/2018 |
| WO | 2013/005555 A1 | 1/2013 |
| WO | 2016/113848 A1 | 7/2016 |
| WO | 2020/110343 A1 | 6/2020 |

OTHER PUBLICATIONS

International Search Report dated Jul. 9, 2019 issued in PCT/JP2019/016979.

* cited by examiner

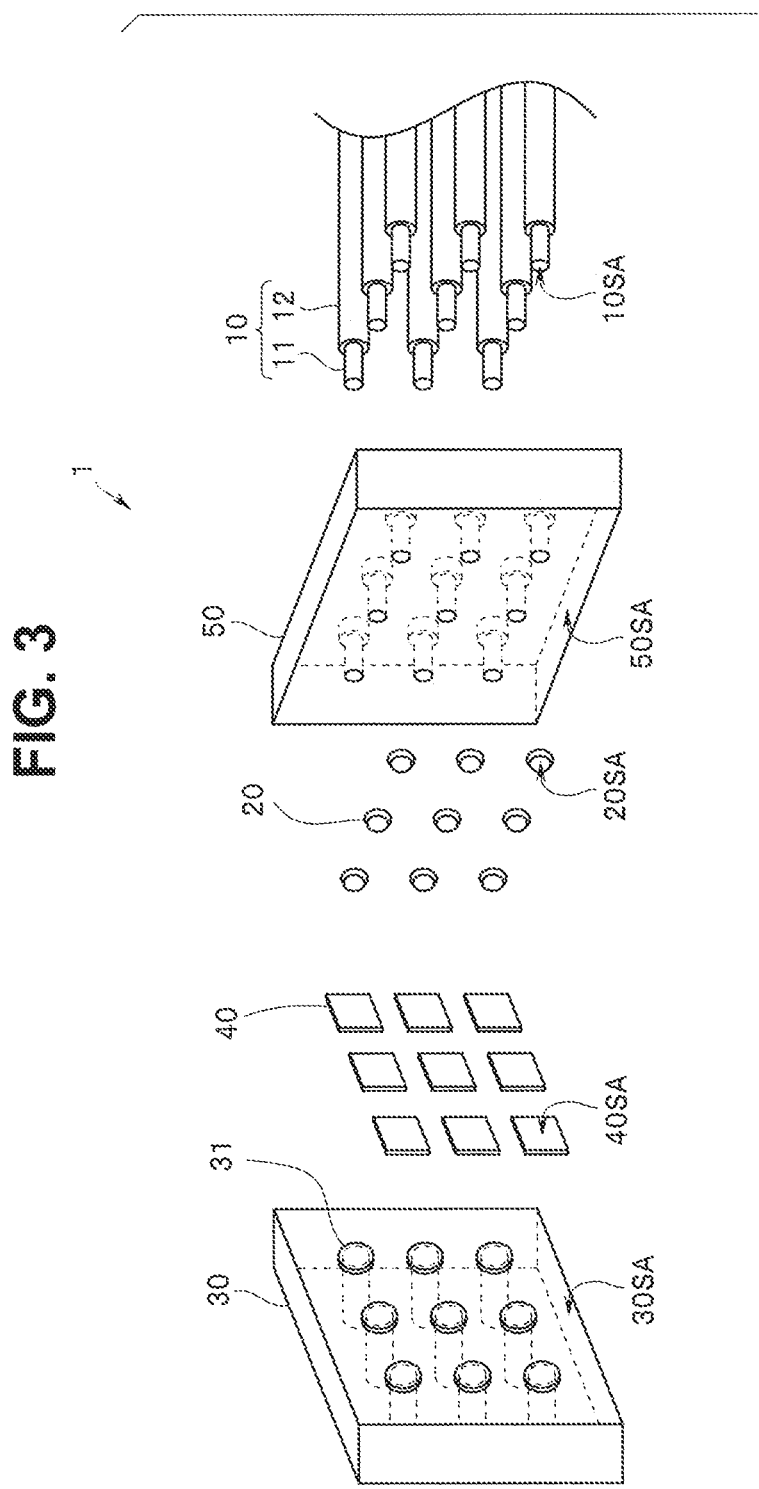

CABLE CONNECTION STRUCTURE

CROSS REFERENCE TO RELATED APPLICATION

This application is a continuation application of PCT/JP2018/043577 filed on Nov. 27, 2018, the entire contents of which are incorporated herein by this reference.

BACKGROUND OF THE INVENTION

1. Field of the Invention

The present invention relates to a cable connection structure in which an electric cable is bonded to an electrode terminal of a substrate.

2. Description of the Related Art

As a method of bonding an electric cable to an electrode terminal of a substrate, solder bonding and ultrasound bonding have been widely used. In the solder bonding, low-melting point metal is disposed on a bonding interface and heat treatment is performed. In the ultrasound bonding, for example, ultrasound vibration is applied in a state in which bonding surfaces, both of which are made of gold, are compression-bonded. Note that, in a semiconductor field, a surface activation bonding method is also used. In the surface activation bonding method, plasma treatment or the like is performed on both bonding surfaces, whereby an oxide layer, an absorbate, and the like are removed in vacuum and, then, the bonding surfaces are immediately compression-bonded.

Japanese Patent Application Laid-Open Publication No. 2012-151183 discloses a low-frequency bonding device. In the device, a metal bump performs a turning motion with respect to an electrode terminal under a condition of a frequency of 5 to 100 Hz.

SUMMARY OF THE INVENTION

A cable connection structure in an embodiment of the present invention includes: at least one electric cable, an end face of a core wire of which is exposed; a first electrode that covers the end face; a substrate, at least one terminal of which is exposed on a principal surface; and a second electrode bonded to the first electrode without another member interposed between the first electrode and the second electrode, the second electrode covering the terminal and having substantially same hardness as hardness of the first electrode.

BRIEF DESCRIPTION OF THE DRAWINGS

FIG. 3 is an exploded view for explaining the cable connection structure in the embodiment;

DETAILED DESCRIPTION OF THE PREFERRED EMBODIMENTS

First Embodiment

Figure 1:
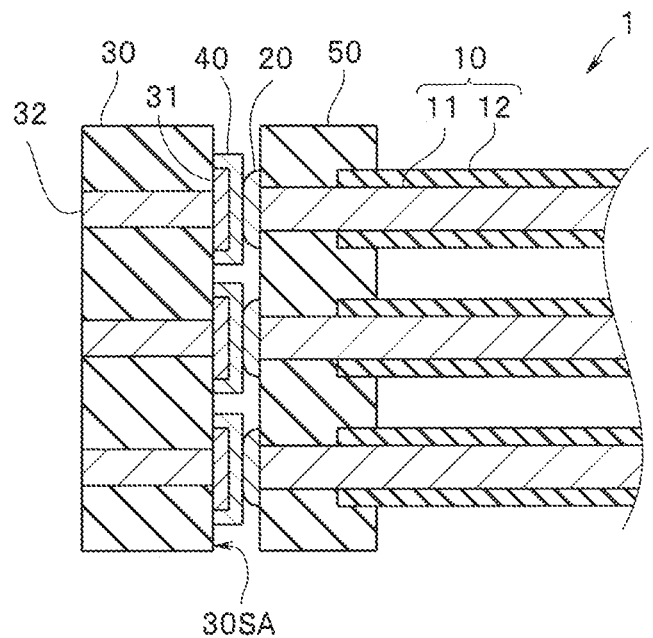
FIG. 1 is a sectional view for explaining a cable connection structure in an embodiment.

As shown in FIG. 1 and FIG. 3, a cable connection structure 1 in the present embodiment includes a plurality of electric cables 10, a plurality of first electrodes 20, a substrate 30, a plurality of second electrodes 40, and a cable fixing unit 50.

Note that, in the following explanation, drawings based on respective embodiments are schematic. It should be noted that relations between thicknesses and widths of respective portions, ratios of the thicknesses of the respective portions, relative angles, and the like are different from real ones. The drawings sometimes include portions having different dimensional relations and rations among the drawings. Illustration of a part of components and assigning of reference signs and numerals to a part of the components are sometimes omitted.

The electric cable 10 includes a core wire 11 made of a conductor and a coating layer 12 that covers the core wire 11. An end face 10SA of the core wire 11 is not covered by the coating layer 12 and is exposed. The cable fixing unit 50 fixes the plurality of electric cables 10 in a predetermined disposition state. The end face 10SA of the electric cable 10 is exposed on a front surface 50SA of the cable fixing unit 50. In other words, the front surface 50SA is a surface on which a plurality of end faces 10SA are exposed. Each of the plurality of first electrodes 20 disposed on the front surface 50SA covers each of the plurality of end faces 10SA.

Note that when the electric cable 10 is a shield cable including a shield wire, the cable fixing unit 50 is configured such that the shield wire is also in a state in which the end face 10SA is exposed on the front surface 50SA (see, for example, Japanese Patent No. 6371414).

On the other hand, a plurality of terminals 31 are exposed on a principal surface 30SA of the substrate 30. Each of the plurality of terminals 31 made of a conductor is, for example, connected to each of a plurality of through wirings 32. Each of the plurality of second electrodes 40 disposed on the principal surface 30SA covers each of the plurality of terminals 31.

Figure 2:
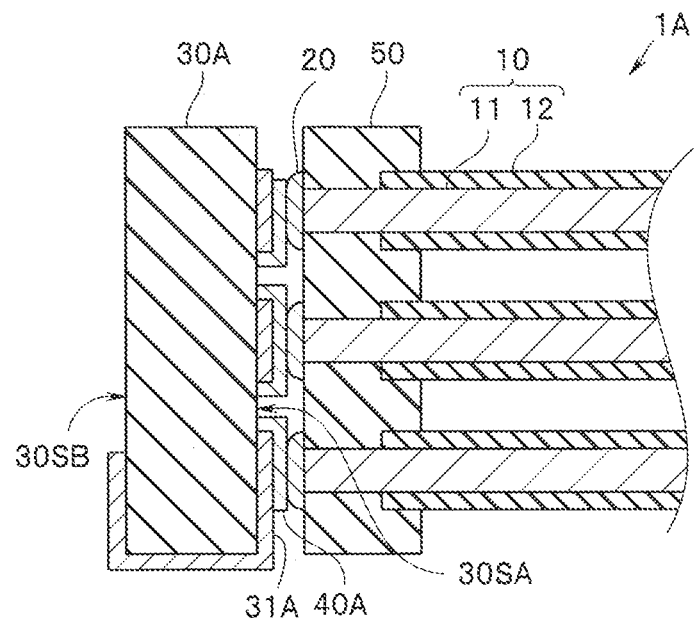
FIG. 2 is a sectional view for explaining a cable connection structure in a modification of the embodiment.
Figure 4A:
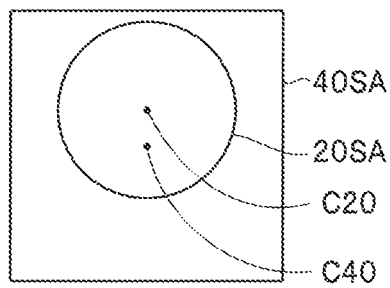
FIG. 4A is a plan schematic view for explaining a cable connection structure bonding method in the embodiment.
Figure 4B:
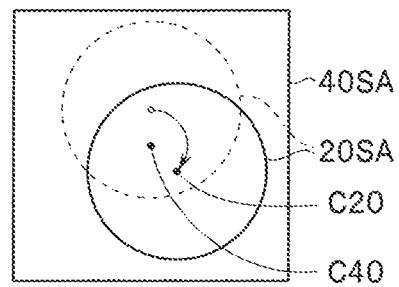
FIG. 4B is a plan schematic view for explaining the cable connection structure bonding method in the embodiment.
Figure 4C:
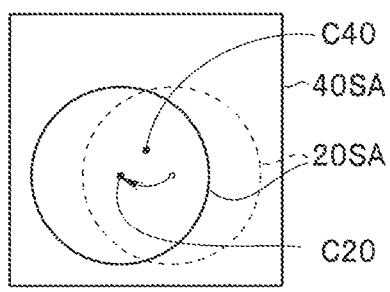
FIG. 4C is a plan schematic view for explaining the cable connection structure bonding method in the embodiment.
Figure 4D:
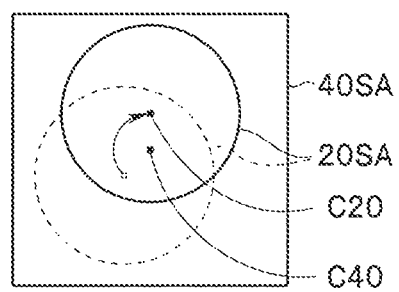
FIG. 4D is a plan schematic view for explaining the cable connection structure bonding method in the embodiment.

Note that, as in a cable connection structure 1A in a modification shown in FIG. 2, a terminal 31A, which is a part of a surface wiring of the principal surface 30SA, may be covered by a second electrode 40A. A part of a wiring configuring the terminal 31A is extended to a rear surface 30SB on an opposite side of the principal surface 30SA through a side surface wiring.

Both of the first electrode 20 and the second electrode 40 are made of an electric copper plating film. Copper is a metal having a characteristic that a natural oxide layer is formed in a normal temperature and normal pressure atmosphere. Accordingly, when bonding treatment is performed in the air, bonding surfaces before bonding are covered by natural oxide layers.

The inventor found that, with a combination of special bonding surfaces, by performing scrubbing treatment for moving relative positions while compression-bonding both the bonding surfaces in the air, even two electrodes made of metal on which natural oxide layers are formed are bonded without another member interposed therebetween.

The scrubbing treatment for the bonding surfaces was performed by, for example, in a state in which one of the bonding surfaces is fixed in the air at normal temperature (25° C.) and humidity of 60%, rotating the other.

More specifically, as shown in FIG. 4A to FIG. 4D, in a state in which a bonding surface 20SA of the first electrode 20 was compression-bonded to a bonding surface 40SA of the second electrode 40 by applying pressure of 30 MPa or less, the scrubbing treatment for the bonding surfaces was performed at a frequency of approximately 5 Hz to 100 Hz such that a center C20 of the first electrode 20 draws an arc centering on a center C40 of the second electrode 40. In other words, the first electrode 20 is rotated at a frequency of approximately 5 Hz to 100 Hz while coming into contact with the second electrode 40. Scrubbing conditions are set as appropriate. For example, in a turning start and a last turn, the center C20 of the first electrode 20 may be located in the center C40 of the second electrode 40.

In order to perform the scrubbing treatment, the first electrode 20 and the second electrode 40 have different areas. The first electrode 20, which is an electrode having a small area, is disposed in the second electrode 40, which is an electrode having a large area. For example, the bonding surface 20SA of the first electrode 20 is a circle having a diameter of 40 μm. The bonding surface 40SA of the second electrode 40 is a square 70 μm on each side. In other words, the area of the first electrode 20 is 1256 μm$^2$ and the area of the second electrode 40 is 4900 μm$^2$.

Figure 5:
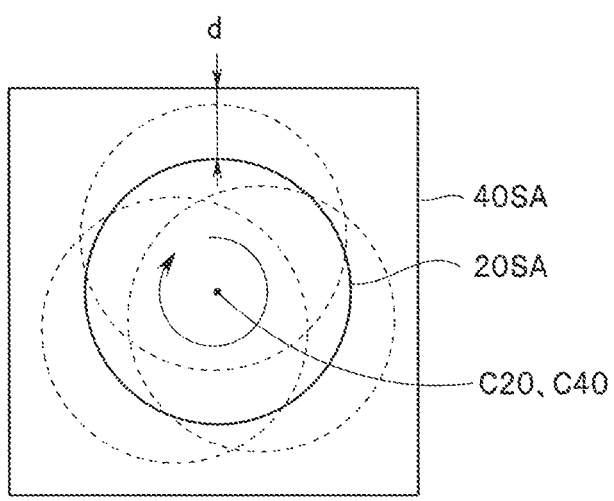
FIG. 5 is a plan schematic view for explaining the cable connection structure bonding method in the embodiment.

Note that, as shown in FIG. 5, in order to perform the scrubbing treatment suitable for bonding, when the first electrode 20 having the small area and the second electrode 40 having the large area are disposed such that the centers C20 and C40 of the first electrode 20 and the second electrode 40 coincide, it is preferable that an average distance d from an outer circumference of the first electrode 20 having the small area to an outer circumference of the second electrode 40 having the large area should be 5 μm or more and 50 μm or less.

When the average distance d from the outer circumference of the first electrode 20 having the small area to the outer circumference of the second electrode 40 having the large area is larger than 50 μm, a scrubbing range is wide and a reduction in size of the cable connection structure is not easy. When the average distance d is smaller than 5 μm, the scrubbing range is small and efficient scrubbing treatment is not easy.

Note that the first electrode 20 is the circle and the second electrode 40 is the square. However, both of the first electrode 20 and the second electrode 40 may be a circle or a rectangle. Further, conversely to the cable connection structure 1, the area of the first electrode 20 may be larger than the area of the second electrode 40.

The cable fixing unit 50 is effective for efficiently bonding the plurality of electric cables 10. For example, the plurality of electric cables 10, the core wires 11 of which project from the coating layer 12, are embedded in resin in a state in which the plurality of electric cables 10 are disposed in a predetermined manner. The cable fixing unit 50, on a polished surface (a front surface 50SA) of which the end faces 10SA of the plurality of electric cables 10 are exposed, can be manufactured by grinding or polishing one surface. Naturally, a process for bonding one electric cable 10 to one terminal 31 without using the cable fixing unit 50 may be repeated.

In the cable connection structure 1, the first electrode 20 and the second electrode 40 were bonded because the first electrode 20 and the second electrode 40 had substantially the same Vickers hardness Hv. In other words, the first electrode 20 and the second electrode 40 are hardness adjustment layers for setting the two bonding surfaces to substantially the same hardness.

Vickers hardness Hv20 of the first electrode 20 was 100. In contrast, Vickers hardness Hv40 of the second electrode 40 was 90 and was substantially the same as the Vickers hardness Hv20. The Vickers hardness Hv was evaluated at weight of 1 g at a room temperature (25° C.) using a method conforming to a micro-Vickers hardness test (JIS-Z2244).

Note that the first electrode 20 and the second electrode 40, both of which are made of a copper plating film, were sometimes not successfully bonded.

When the first electrode 20 and the second electrode 40 were not successfully bonded, the Vickers hardness Hv20 of the first electrode 20 was 180 and the Vickers hardness Hv40 of the second electrode 40 was 90.

The first electrode 20 and the second electrode 40 were formed under the same conditions using the same copper sulfate electric plating bath. However, a hardness difference Hv-Δ occurred in the Vickers hardness Hv because the numbers of elapsed days after the film formation were different.

Figure 6:
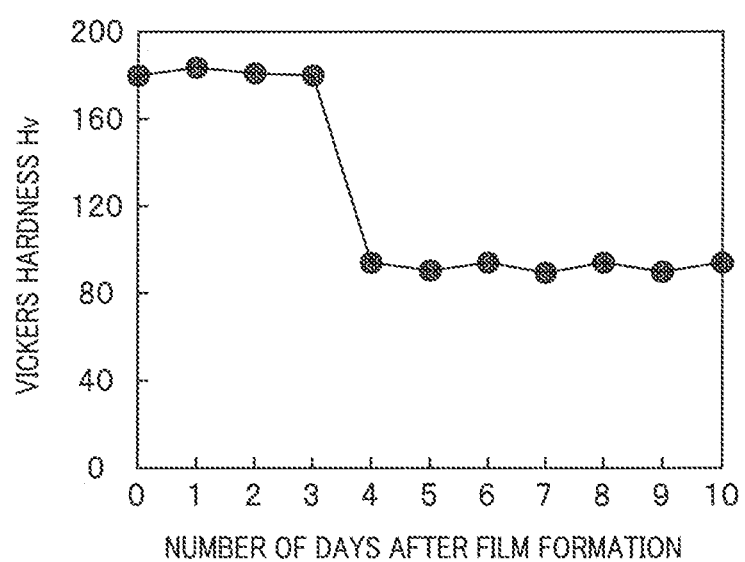
FIG. 6 is a diagram showing a hardness change of an electrode film of the cable connection structure in the embodiment.

In other words, in an electric copper plating film, self-anneal occurs in which a crystal grain diameter and hardness change even at a room temperature after film formation. As shown in FIG. 6, the Vickers hardness Hv of the copper plating film immediately after the film formation and after elapse of three days was 180. In contrast, the Vickers hardness Hv of the copper plating film after elapse of seven days was 90.

When the first electrode 20 and the second electrode 40 were not successfully bonded, three days or less elapsed after the first electrode 20 was formed and seven days or more elapsed after the second electrode 40 was formed.

Further, the hardness of the copper plating film greatly changes according to a composition of a plating bath and a film formation condition as well. In other words, the copper plating film includes trace elements other than copper, for example, carbon, sulfur, and hydrogen and the hardness of the copper plating film changes according to contents of the trace elements.

However, if the first electrode 20 and the second electrode 40 had substantially the same Vickers hardness Hv, natural oxide layers on the surfaces of the first electrode 20 and the second electrode 40 were peeled by the scrubbing treatment. A bonding interface formed by the metal copper and the metal copper and having high bonding reliability was obtained.

Having substantially the same Vickers hardness Hv means that a hardness difference Hv-Δ between an arithmetic mean Hv-ave of the Vickers hardness Hv20 of the first electrode 20 and the Vickers hardness Hv40 of the second electrode 40 and the Vickers hardness Hv20 (the Vickers hardness Hv40) is 30% or less and, preferably, 10% or less of the arithmetic mean Hv-ave.

For example, in the bonded cable connection structure 1, the Vickers hardness Hv20 is 100 and the Vickers hardness Hv40 is 90. Therefore, the arithmetic mean Hv-ave is 95 and the hardness difference Hv-Δ is 5 (5.2% of the arithmetic mean Hv-ave). In contrast, in a cable connection structure that is not successfully bonded, the Vickers hardness Hv20 is 180 and the Vickers hardness Hv40 is 90. Therefore, the arithmetic mean Hv-ave is 135 and the hardness difference Hv-Δ is 90 (67% of the arithmetic mean Hv-ave).

When the hardness of the first electrode 20 and the hardness of the second electrode 40 are different, an oxide layer on a soft bonding surface is removed but an oxide layer on a hard bonding surface is not removed. Therefore, the first electrode 20 and the second electrode 40 are not bonded.

The cable connection structure 1 is inexpensive because expensive gold is not used and the bonding treatment is performed in the air. The cable connection structure 1 has a bonding interface formed by the metal copper and the metal copper and having high bonding reliability.

Note that, in the cable connection structure 1, both of the bonding surfaces of the first electrode 20 and the second electrode 40 are deformed by the scrubbing, whereby removal of the oxide layers is accelerated.

Accordingly, it is preferable that the Vickers hardness Hv of both of the first electrode 20 and the second electrode 40 should be larger than 50 and smaller than 200. When the Vickers hardness Hv is equal to or smaller than the range, since the bonding surfaces are excessively greatly deformed, it is not easy to obtain satisfactory bonding. When the Vickers hardness Hv is equal to or larger than the range, since the deformation is insufficient, the removal of the oxide layers is not easy.

Note that it is preferable that the hardness Hv20 of the first electrode 20 should be smaller than hardness of the core wire 11 and the hardness Hv40 of the second electrode 40 should be smaller than hardness of the terminal 31. This is because it is preferable that only the first electrode 20 and the second electrode 40 should be deformed.

Figure 7:
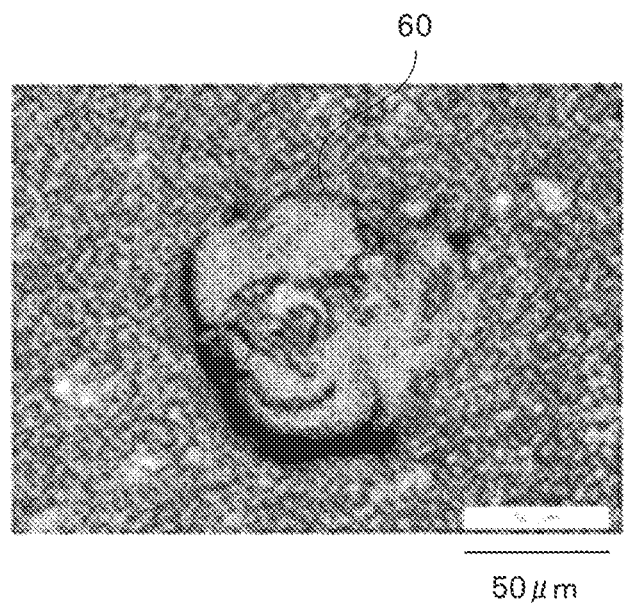
FIG. 7 is an SEM photograph of a particle on a peeling surface of the cable connection structure in the embodiment.
Figure 8:
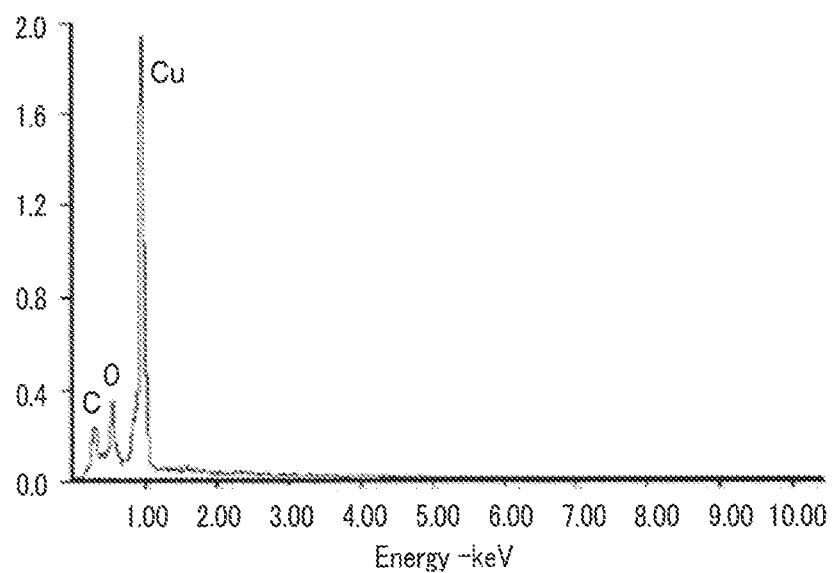
FIG. 8 is a diagram showing a composition analysis result of the particle shown in FIG. 7.

The removed oxide layers are discharged to an outside of the bonding interface. However, when the oxide layers were peeled after the bonding and the bonding interface was observed, a particle 60 was interposed in a part of the interface (FIG. 7). FIG. 8 is a result of an element analysis (EDX) of a discolored region considered not to contribute to the bonding on a surface of the particle 60. Although not shown, a peripheral region of the particle 60 was also analyzed.

In the particle 60, oxygen not detected in the peripheral region was detected. In other words, the particle 60 was an oxide particle generated by the peeling of the surface oxide layers.

Figure 9:
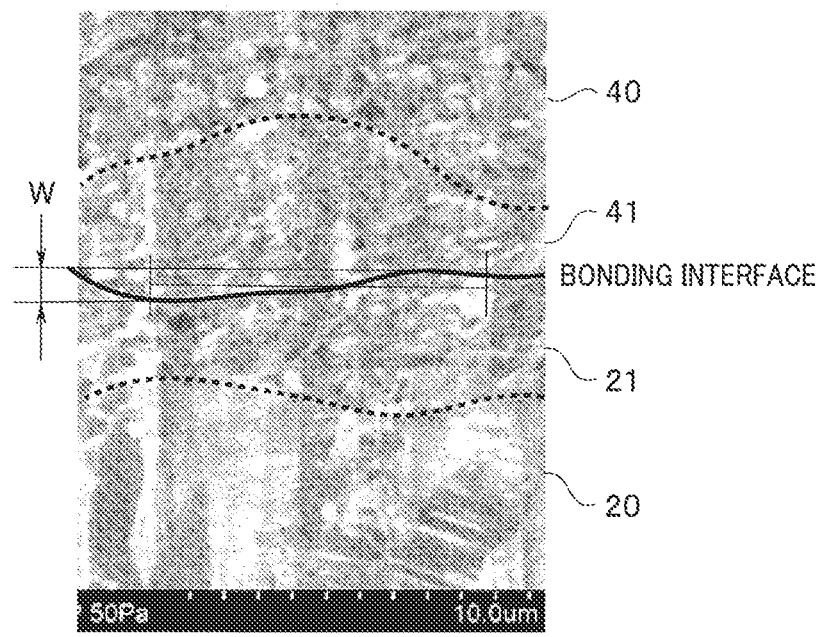
FIG. 9 is an SEM photograph of a bonding cross section of the cable connection structure in the embodiment.

Note that, as shown in a cross-sectional photograph photographed using a scanning electron microscope (SEM) shown in FIG. 9, an altered layer 21 having a smaller crystal grain diameter than other regions of the first electrode 20 was present on the bonding surface of the first electrode 20. An altered layer 41 having a smaller crystal grain diameter than other regions of the second electrode 40 was present on the bonding surface of the second electrode 40. Thickness of the altered layers 21 and 41 is 1 μm to 10 μm.

The altered layers 21 and 41 are considered to be a machined altered layer generated by the scrubbing treatment.

As shown in FIG. 9, in the cable connection structure 1, if the Vickers hardness Hv of both the bonding surfaces is larger than 50 and smaller than 200, unevenness of the bonding surfaces is flattened by the scrubbing treatment. As shown in FIG. 9, in the cable connection structure 1, an undulation value W of the bonding interface was 1.1 μm.

The undulation value W of the bonding interface is a difference (a measured length 10 μm) between a maximum value and a minimum value with respect to a center line of the interface when being observed in a cross section.

As explained above, in the surface activation bonding, the bonding surfaces need to be flat surfaces. The bonding interface is a plane and the undulation value W is extremely small, for example, smaller than 0.1 μm. Conversely, if the undulation value W of the bonding surfaces is 0.1 μm or more, it is evident that the bonding surfaces are not the bonding surfaces by the surface activation bonding method. In contrast, in the cable connection structure 1, the undulation value W of the bonding interface is 0.1 μm or more and is, in most cases, 0.5 μm or more.

Note that an upper limit of the undulation value W is not particularly limited. However, when the bonding surfaces are bonded in a short time, it is preferable that the upper limit of the undulation value W should be 5 μm or less.

Figure 10:
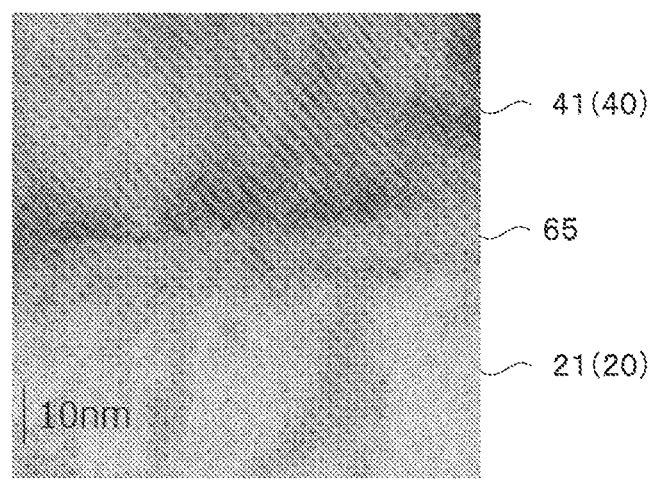
FIG. 10 is a TEM photograph of the bonding cross section of the cable connection structure in the embodiment.

On the other hand, FIG. 10 is a cross-sectional photograph photographed using a transmission electron microscope (TEM). As shown in FIG. 10, an intermediate layer 65 made of microcrystal or amorphous having a crystal grain diameter of 10 nm or less was sometimes observed on the bonding interface between the first electrode 20 and the second electrode 40. The intermediate layer 65 is a metal layer not containing oxygen.

The altered layers 21 and 41 and the intermediate layer 65 are components specific to the cable connection structure 1 bonded using the scrubbing treatment. In other words, if the altered layers 21 and 41 or the intermediate layer 65 is present in a cable connection structure, the cable connection structure can be regarded as being bonded using the scrubbing treatment.

Note that the above explanation is about the cable connection structure 1 in which the two electrodes made of the electric copper plating film are bonded. However, in the cable connection structure in the embodiment, at least one of the two electrodes may be made of, for example, an electroless copper plating film, a copper vapor deposited film, a copper sputter film, or a rolled copper foil. For example, even in a cable connection structure including a first electrode made of the rolled copper foil and a second electrode made of the electroless copper plating film, the first electrode and the second electrode can be bonded if the first electrode and the second electrode have substantially the same Vickers hardness.

At least one of the first electrode 20 or the second electrode 40 may be made of metal containing copper as a main component by 50 weight % or more, for example, CuNi, CuSn, or CuBe. For example, even after the self-anneal, by using, as the first electrode 20, a Cu-15 weight % Sn electric plating film having Vickers hardness Hv of 190, the first electrode 20 can be bonded to the second electrode 40 made of an electric copper plating film (Vickers hardness Hv=180) immediately after being plated. The metal containing copper as the main component is inexpensive and the bonding according to the present invention is easy.

Note that if the terminal 31 of the principal surface 30SA of the substrate 30 is made of copper and Vickers hardness of the terminal 31 is substantially the same as the Vickers hardness of the first electrode 20, the terminal 31 can be bonded to the first electrode. In this case, the terminal 31 is regarded as the second electrode.

For example, when both of the terminal 31 of the principal surface 30SA of the substrate 30 and the core wire 11 of the electric cable 10 are made of wire materials having substantially the same Vickers hardness larger than 50 and smaller than 200, the terminal 31 and the core wire 11 are bonded without another member interposed therebetween. In this case, the end face 10SA of the core wire 11 is regarded as the first electrode and the terminal 31 is regarded as the second electrode.

In other words, the first electrode 20 and the second electrode 40 are not essential constituent elements of the cable connection structure of the present invention. However, the Vickers hardness Hv of the terminal 31 and the core wire 11 is also likely to change with time. In the cable connection structure including the first electrode 20 and the second electrode 40, which are hardness adjustment layers having substantially the same hardness, the first electrode 20 and the second electrode 40 can be bonded irrespective of the Vickers hardness Hv of the terminal 31 and the core wire 11.

Note that the first electrode 20 and the second electrode 40 are not limited to the metal containing copper as the main component. It is evident that, even if the first electrode 20 and the second electrode 40 are made of metal having a characteristic that a natural oxide layer is formed in the air, for example, metal containing Sn or Al as a main component, if the first electrode 20 and the second electrode 40 have substantially the same Vickers hardness, the first electrode 20 and the second electrode 40 are bonded without another member interposed therebetween. Further, like the electrode containing copper as the main component, the first electrode 20 and the second electrode 40 preferably have Vickers hardness larger than 50 and smaller than 200.

The present invention is not limited to the embodiments, the modifications, and the like explained above. Various changes, combinations, and applications are possible in a range not departing from the gist of the invention.

What is claimed is:

1. A cable connection structure comprising:
   at least one electric cable, an end face of a core wire of which is exposed;
   a first electrode that covers the end face;
   a substrate, at least one terminal of which is exposed on a principal surface; and
   a second electrode bonded to the first electrode without another member interposed between the first electrode and the second electrode, the second electrode covering the terminal and having substantially a same hardness as a hardness of the first electrode;
   wherein altered layers having a small crystal grain diameter are respectively present on bonding surfaces of the first electrode and the second electrode.

2. The cable connection structure according to claim 1, wherein both of the first electrode and the second electrode are made of metal on which a natural oxide layer is formed.

3. The cable connection structure according to claim 1, wherein the hardness is Vickers hardness.

4. The cable connection structure according to claim 1, wherein the first electrode and the second electrode have Vickers hardness larger than 50 and smaller than 200.

5. The cable connection structure according to claim 1, wherein the first electrode and the second electrode contain copper as a main component.

6. The cable connection structure according to claim 1, wherein the first electrode has a first surface area and the second electrode has a second surface area different than the first surface area, wherein one of the first electrode and the second electrode having a smaller surface area is disposed on the other of the first electrode and the second electrode having a larger surface area.

7. The cable connection structure according to claim 1, wherein an oxide particle is interposed in a part of a bonding interface between the first electrode and the second electrode.

8. The cable connection structure according to claim 1, wherein the at least one electric cable comprises a plurality of electric cables, each having an end face and corresponding core wire,
   the cable connection structure further comprising a cable fixing unit that fixes each end face to a predetermined disposition position.

9. A cable connection structure comprising:
   at least one electric cable, an end face of a core wire of which is exposed;
   a first electrode that covers the end face;
   a substrate, at least one terminal of which is exposed on a principal surface; and
   a second electrode bonded to the first electrode without another member interposed between the first electrode and the second electrode, the second electrode covering the terminal and having substantially a same hardness as a hardness of the first electrode;
   wherein an intermediate layer made of microcrystal or amorphous having a crystal grain diameter of 10 nm or less is present on a bonding interface between the first electrode and the second electrode.

10. The cable connection structure according to claim 9, wherein both of the first electrode and the second electrode are made of metal on which a natural oxide layer is formed.

11. The cable connection structure according to claim 9, wherein the hardness is Vickers hardness.

12. The cable connection structure according to claim 9, wherein the first electrode and the second electrode have Vickers hardness larger than 50 and smaller than 200.

13. The cable connection structure according to claim 9, wherein the first electrode and the second electrode contain copper as a main component.

14. The cable connection structure according to claim 9, wherein the first electrode has a first surface area and the second electrode has a second surface area different than the first surface area, wherein one of the first electrode and the second electrode having a smaller surface area is disposed on the other of the first electrode and the second electrode having a larger surface area.

15. The cable connection structure according to claim 9, wherein an oxide particle is interposed in a part of a bonding interface between the first electrode and the second electrode.

16. The cable connection structure according to claim 9, wherein the at least one electric cable comprises a plurality of electric cables, each having an end face and corresponding core wire,
   the cable connection structure further comprising a cable fixing unit that fixes each end face to a predetermined disposition position.

* * * * *